(12) United States Patent
Schroeder et al.

(10) Patent No.: US 8,671,631 B2
(45) Date of Patent: Mar. 18, 2014

(54) PANEL MOUNTING SYSTEM

(75) Inventors: Mark Schroeder, Cordova, CA (US);
Sean Du Fosee, Fair Oaks, CA (US);
Mark Moore, Richmond, CA (US);
Sean Westbrook, Pacifica, CA (US);
Ryan Bogart, San Francisco, CA (US)

(73) Assignee: PV Hardware LLC, Carmichael, CA (US)

( * ) Notice: Subject to any disclaimer, the term of this patent is extended or adjusted under 35 U.S.C. 154(b) by 0 days.

(21) Appl. No.: 13/275,144

(22) Filed: Oct. 17, 2011

(65) Prior Publication Data

US 2013/0092215 A1    Apr. 18, 2013

(51) Int. Cl.
*E04D 13/18*    (2006.01)
*H02N 6/00*    (2006.01)

(52) U.S. Cl.
USPC ............................ 52/173.3; 136/244

(58) Field of Classification Search
USPC ......... 52/173.3; 126/571, 600, 601, 602, 603, 126/604, 605, 606, 607, 608, 623, 680, 696, 126/700; 136/244–265; 248/676, 291.1
See application file for complete search history.

*Primary Examiner* — Jeanette E Chapman
*Assistant Examiner* — James Buckle, Jr.
(74) *Attorney, Agent, or Firm* — Levine Bagade Han LLP

(57) ABSTRACT

A module system including a frame, rack or mounting apparatus for mounting modules or panels, such as solar panels, is disclosed. The rack can maintain the modules in a module plane. The rack can be adjusted to alter the module plane. The frame can be constructed of purlins slid through a rotatable support beam.

10 Claims, 12 Drawing Sheets

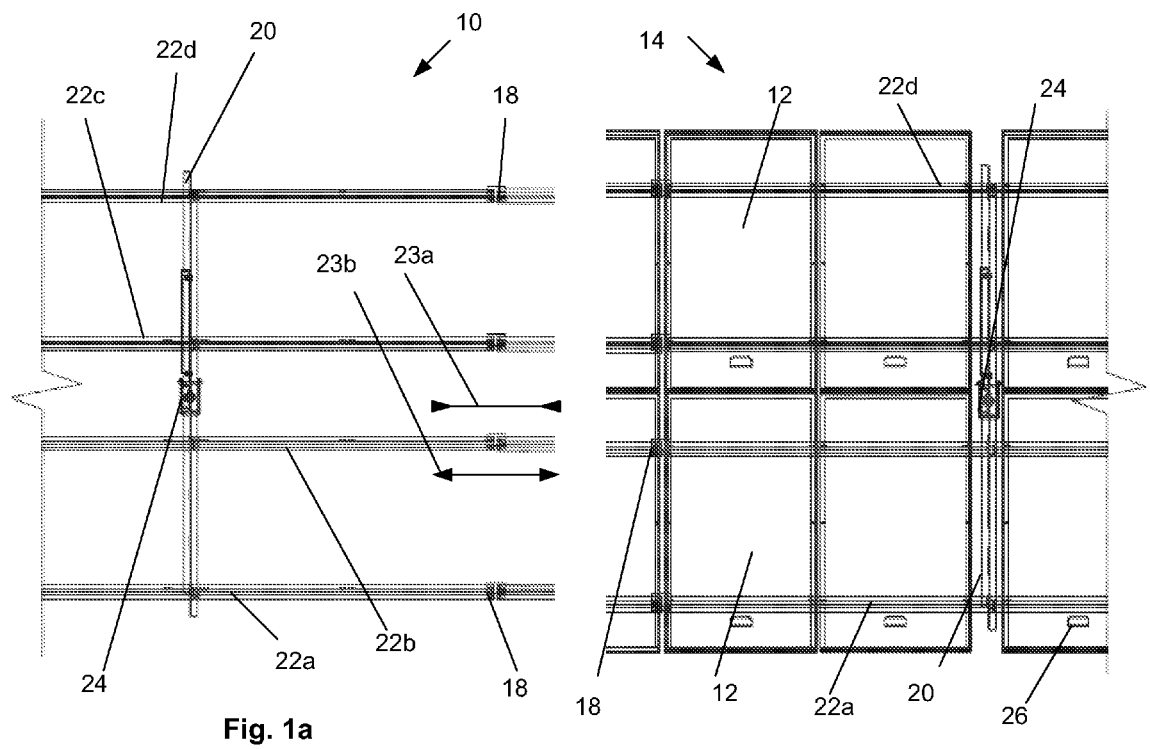
Fig. 1a
Fig. 1b
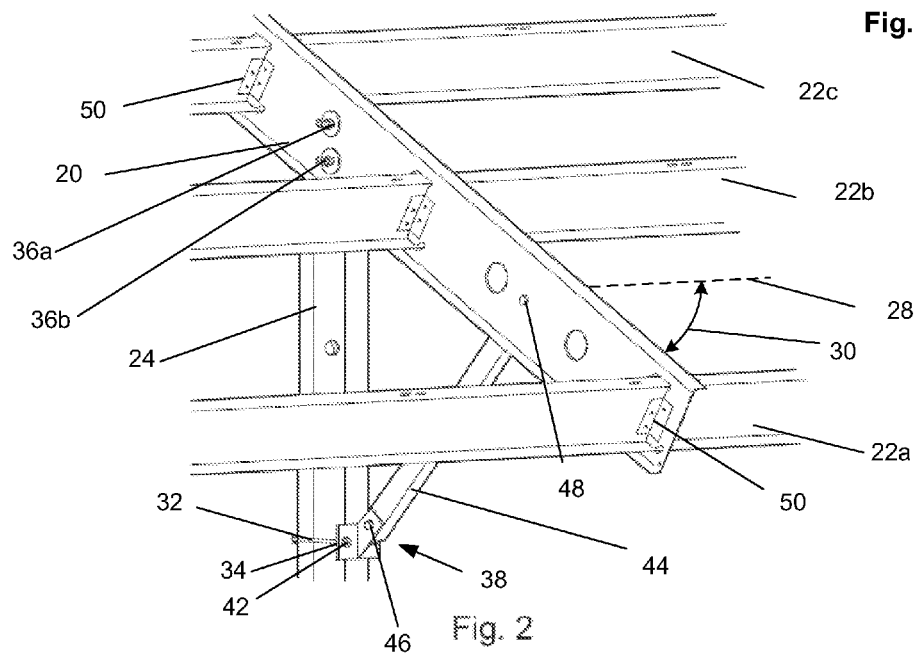
Fig. 2

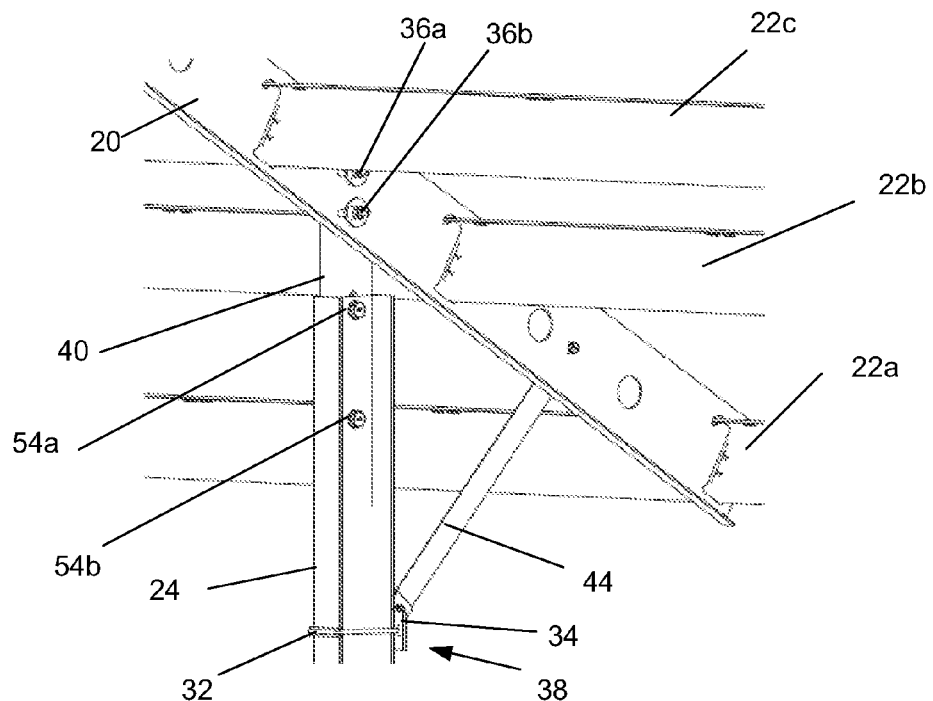
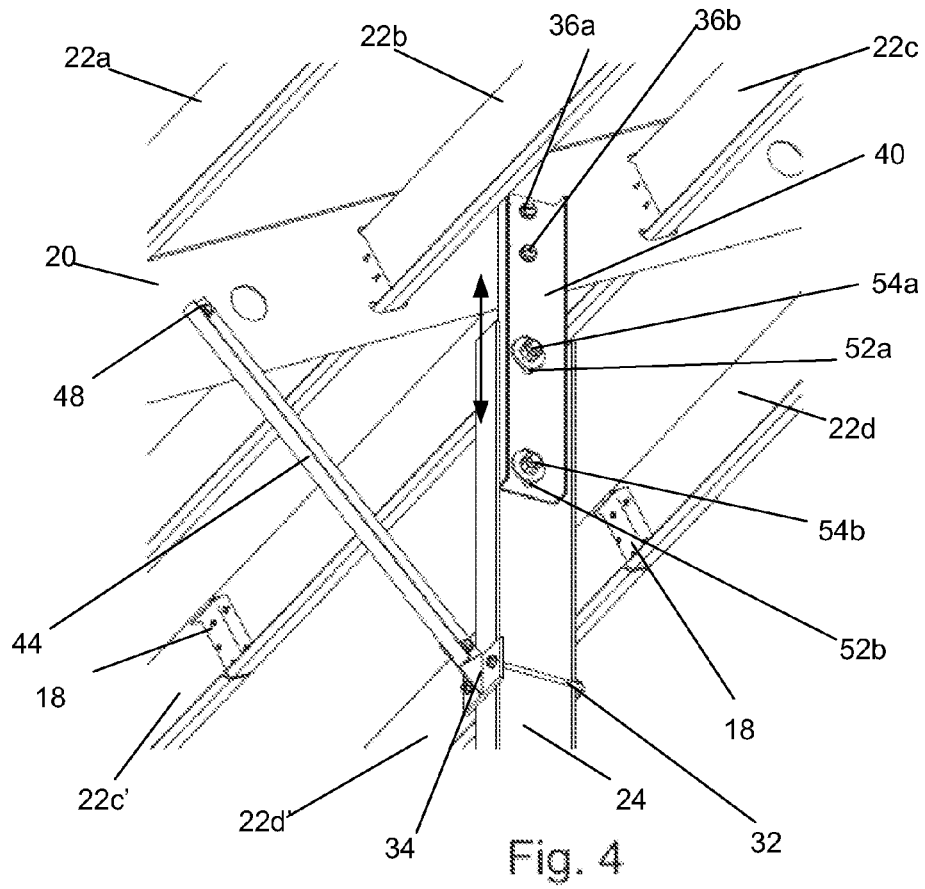

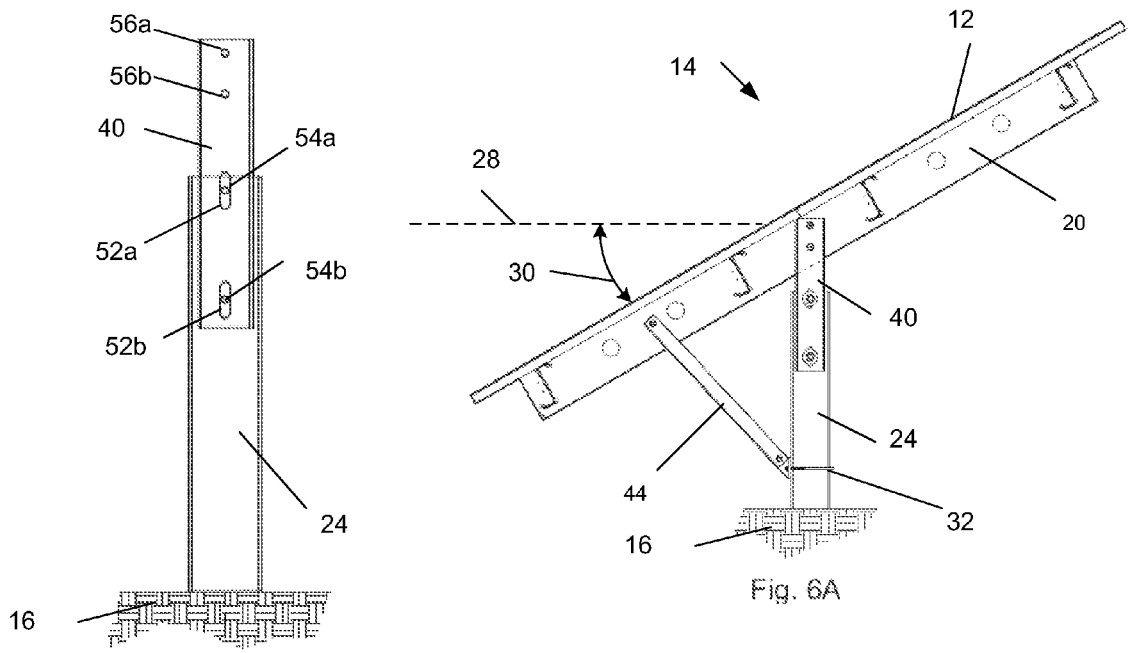
Fig. 5
Fig. 6A
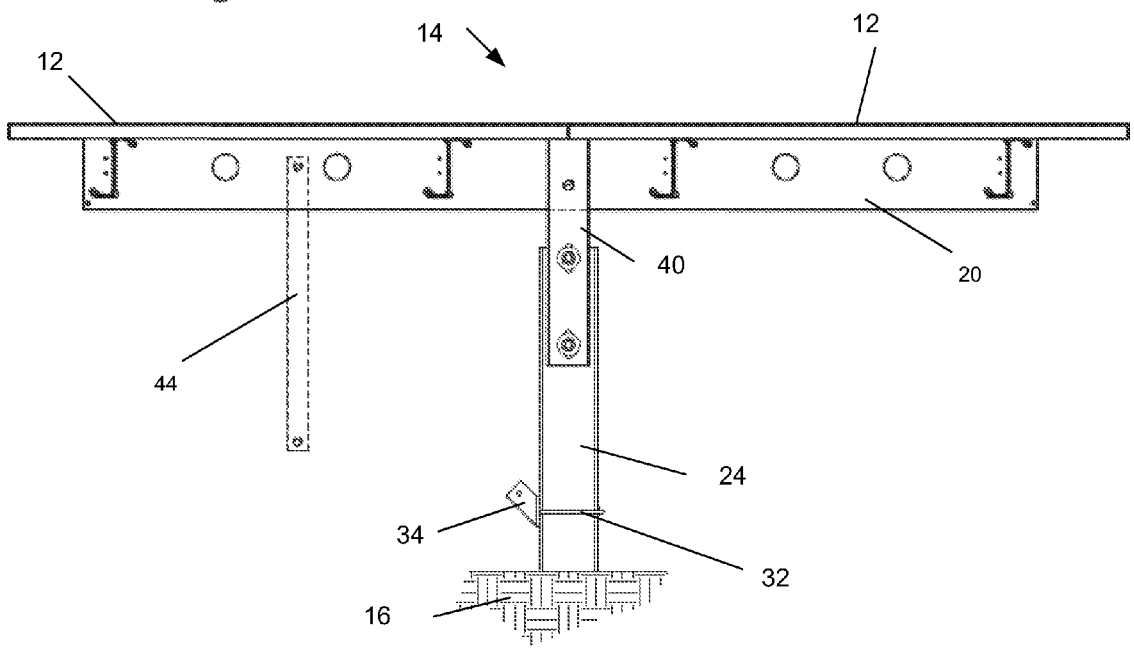
Fig. 6B

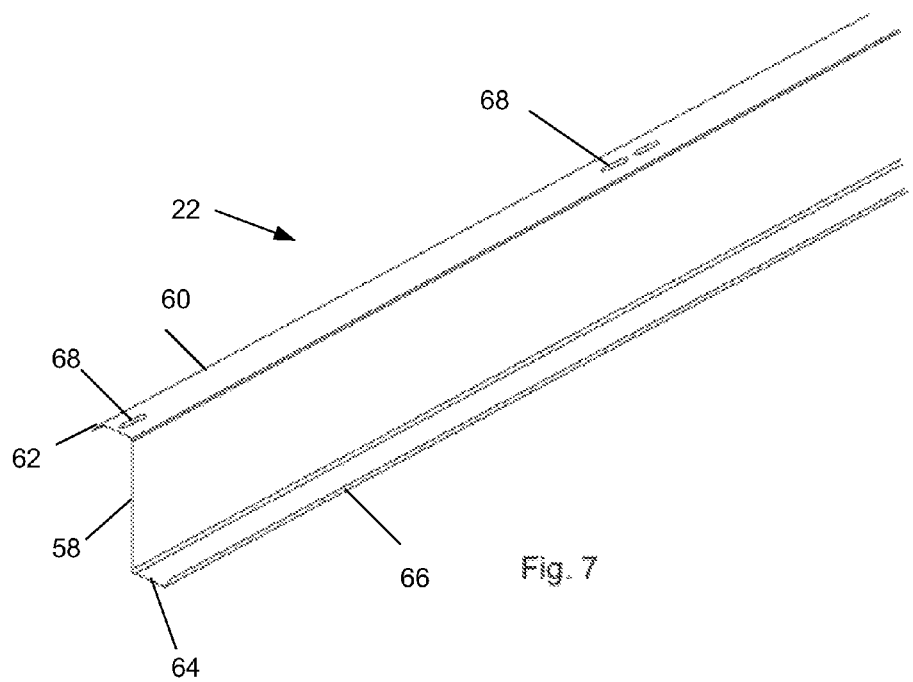
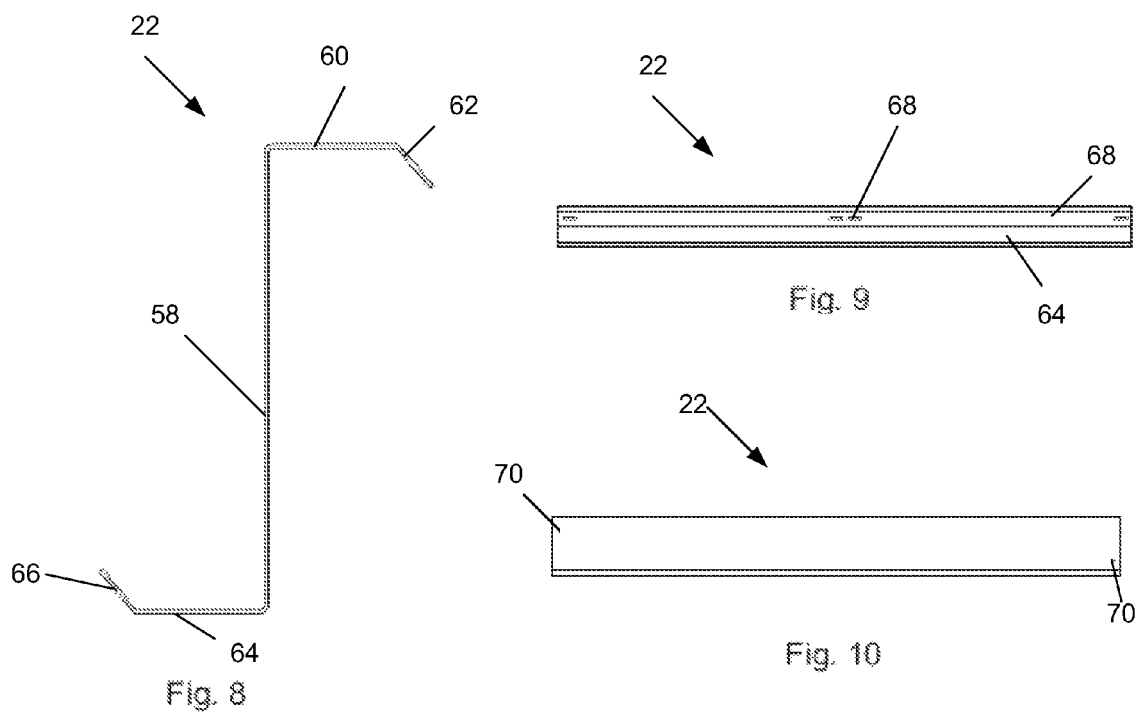

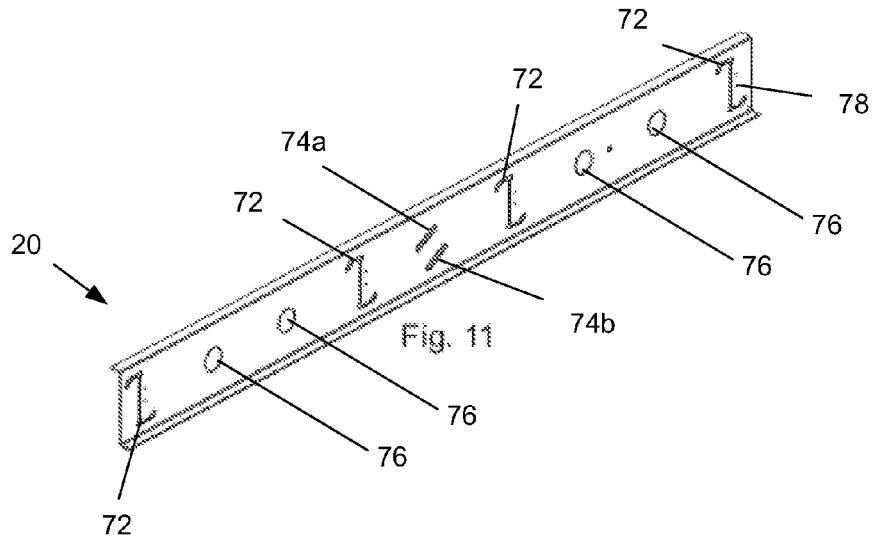
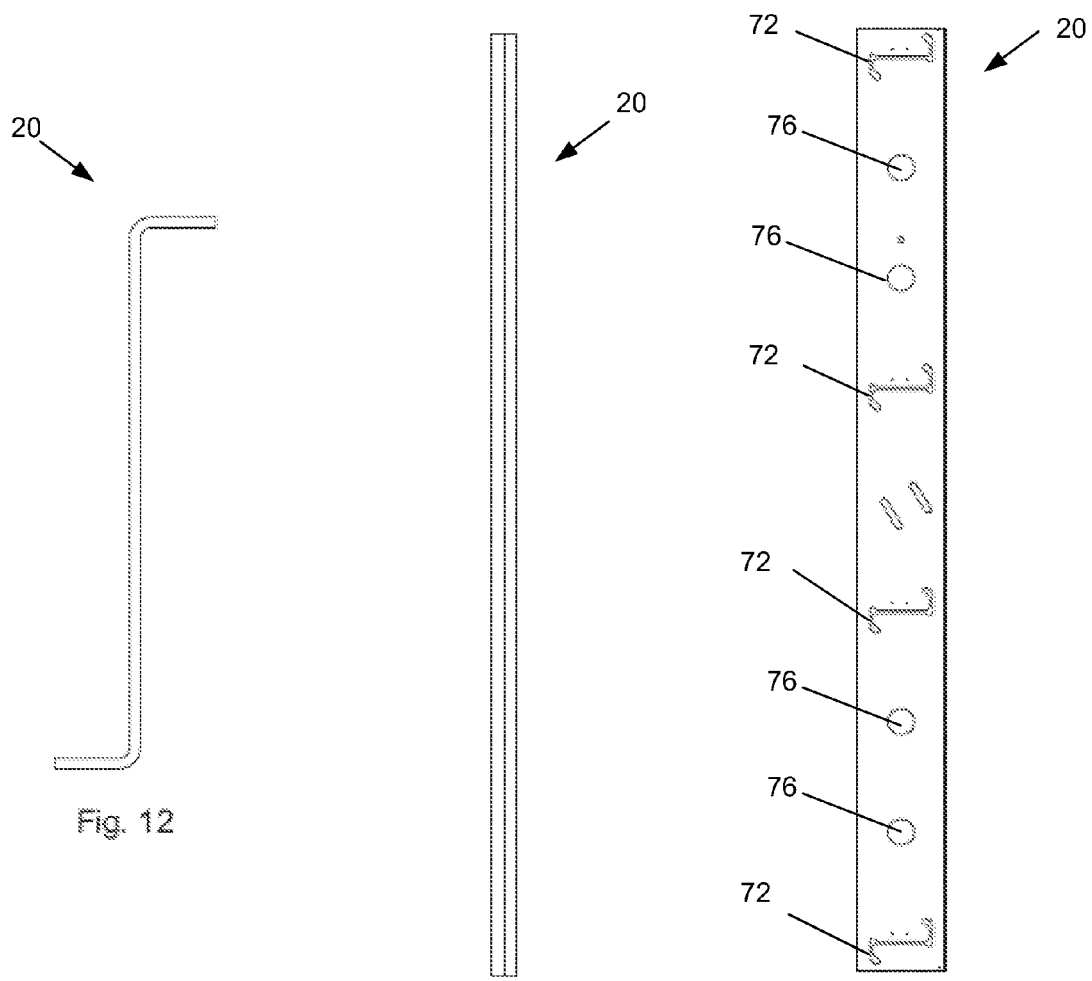
Fig. 12
Fig. 13 Fig. 14

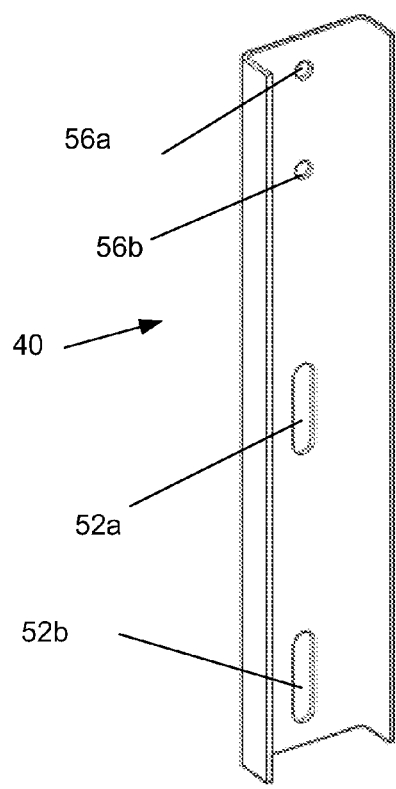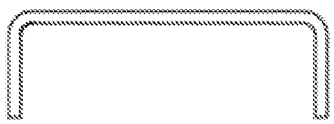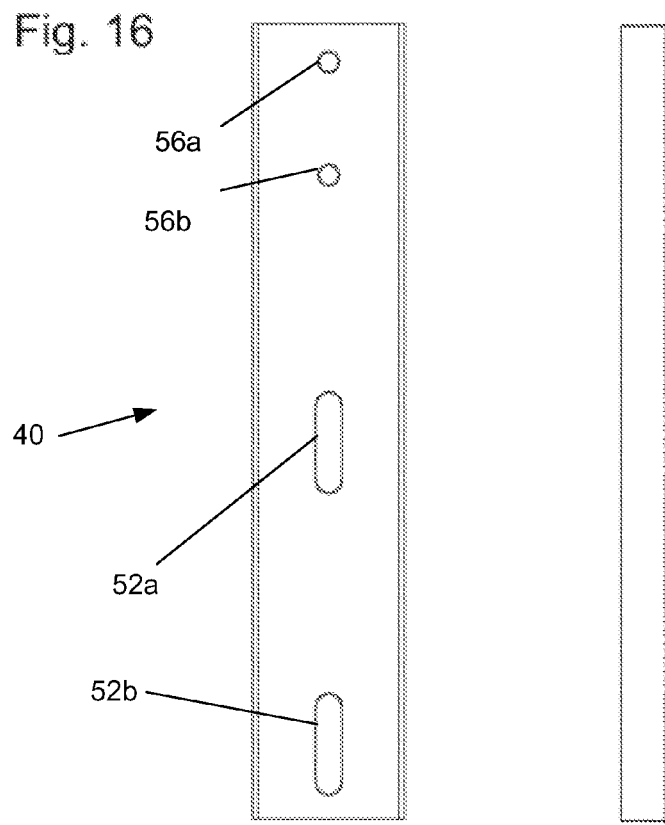
Fig. 16
Fig. 17
Fig. 18
Fig. 19

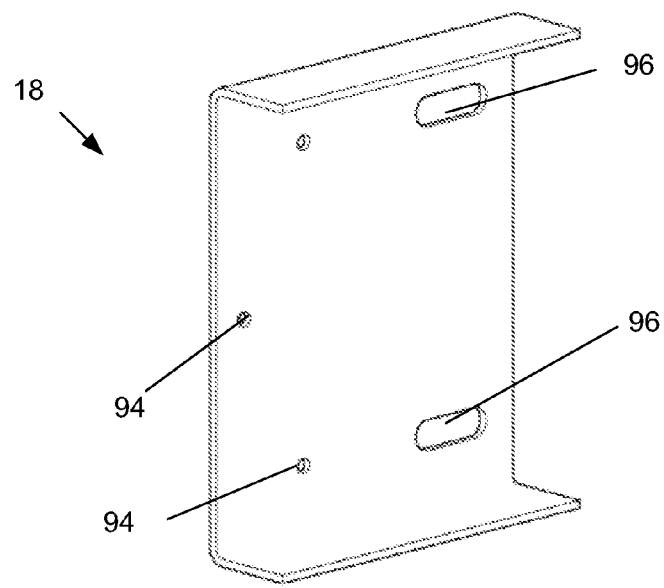
Fig. 29
Fig. 30
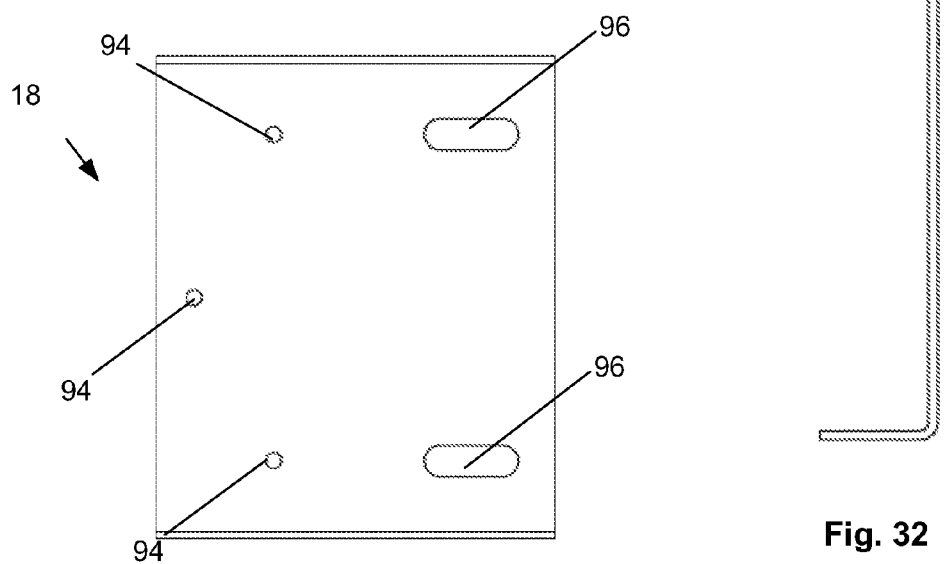
Fig. 31
Fig. 32

PANEL MOUNTING SYSTEM

BACKGROUND

1. Field of the Invention

The present invention relates generally to a system for mounting and installing photovoltaic solar panels, and more particularly, to a mounting support system that can be rapidly constructed on a large scale.

2. Description of the Related Art

Solar photovoltaic (PV) cells convert light directly into electricity. By utilizing the most abundant, renewable energy available on the planet, namely the sun's rays, PV cells can provide a non-polluting source of electrical energy. As global energy consumption rises the need for clean, renewable sources of power has increased tremendously. This combined with the increased costs of conventional, fossil fuel based energy sources has led to a new era where solar PV systems can generate electricity at market competitive rates on a per kilowatt-hour basis.

The rapid adoption, development and construction of PV based power plants has led to greater and greater market opportunities for companies producing PV modules. A PV module is an assembly of solar PV cells, typically in a glass laminate which is contained in a frame composed of aluminum or other metal. The PV module acts as an electrical component of a system of many such modules. Thousands of modules are strung together electrically to form commercial arrays for the generation of many thousands of kilowatts, or 'megawatts' of power. The greatly expanded market for PV modules combined with federal, state and local government incentive programs as well as huge investments in production capacity has created tremendous competition among PV module manufacturers. This competition has resulted in PV modules that now retail for as little as $1.00 per watt capacity at peak power output of the module. This compared to PV module prices of $4-$5 per watt just a few years ago.

The rapid decrease in PV module costs in combination with the desire on the part of electrical utilities to own renewable energy assets has led to a renewed focus on so-called, 'balance of system component' costs. These components include DC-AC inverters, electrical connection components, and the racking systems used to hold the PV modules in place and exposed to the sun's rays. The racking systems must present the modules to the sun at a favorable degree of tilt while maintaining their structural capacity for 20 to 30 years which is the warranted energy production lifetime of the PV modules.

The racking systems used for PV modules are often referred to as mounting structures. These systems are typically composed of metal, usually steel or aluminum. The systems have an element that is placed in the ground or attached to large ballast blocks typically of concrete. From this post or pier the system stands in the air supporting the PV modules at a height that is appropriate to prevent ground cover, encroaching weeds, or blown up topsoil from affecting the light exposure of the modules but not so tall as to require excess building materials. The primary structural load on these systems is created by wind forces acting on the PV modules themselves. The mounting systems present the modules to the wind in a manner not unlike a sail boat holds a sail—thus great amounts of wind load can be present in a typical PV system.

As PV module mounting systems are deployed for larger and larger ground based systems the need to reduce the costs of the system through better engineering, reduction in total materials required and the innovative use of standardized commercial construction elements continues to rise. The costs and time associated with actual construction of the systems is also the subject of intense scrutiny as commercial building contractors look to be more and more competitive in the installation and commissioning of commercial and utility based PV power systems.

The overall ease with which a PV mounting system can be delivered to the construction site, assembled, installed and finally commissioned is referred to in the PV power industry as 'constructability'. There are many factors that play into good constructability, among them the reduction in labor hours required to assemble the system or the elimination of special trades and skills being required to complete the assembly. The elimination or reduction in special tools or expensive equipment needed is also a good step toward better constructability. Finally the ability to install the mounting systems in many differing climates, types of terrain, and in naturally occurring hazards such as wind, rain or snow can be the key to a suitable design for low cost, high value PV power systems.

From these requirements for good constructability it can be understood that a PV mounting system which reduces the field labor hours required to build it and that eliminates costly, highly skilled trade workers would be desirable. A mounting system that can be assembled without the use of specialized tools or expensive and difficult to place equipment, such as cranes and hoists, would also be beneficial. Furthermore a system which can be sited on uneven terrain and made level through a series of minor adjustments, both to the height of the modules and the tile angle of the assembly, would allow for an assembly sequence with fewer steps. And lastly a PV mounting system that has at its core a utilization of readily available components that can take advantage of already high production quantities in industry would lead to lower costs for structural elements and thus be a substantial improvement over specialty componentry produced of expensive materials in small quantities unable to reach commercial market cost requirements.

BRIEF DESCRIPTION OF THE DRAWINGS

FIG. 1a is a top view of a length of a variation of the frame at a tilt angle.

FIG. 1b is a top view of a length of a variation of the assembled system at a tilt angle.

FIG. 2 is a first side view of a portion of a variation of the frame at a tilt angle.

FIG. 3 is a second side view of a portion of a variation of the frame at a tilt angle.

FIG. 4 is a bottom side perspective view of a variation of the frame at a tilt angle.

FIG. 5 illustrates a variation of the post and post-to-support beam connector.

FIGS. 6a and 6b illustrate side views of a variation of the module system in tilted and flat configurations, respectively.

FIGS. 7 through 10 are perspective, end, top and side views, respectively, of a variation of the structural beam.

FIGS. 11 through 14 are perspective, end, top and side views, respectively, of a variation of the support beam.

FIGS. 16 through 19 are perspective, top, side and top views, respectively, of a variation of the post-to-support beam connector.

FIGS. 29 through 32 are perspective, top, side, and end views, respectively, of a variation of the thermal expansion joint.

DETAILED DESCRIPTION

Figure 15A:
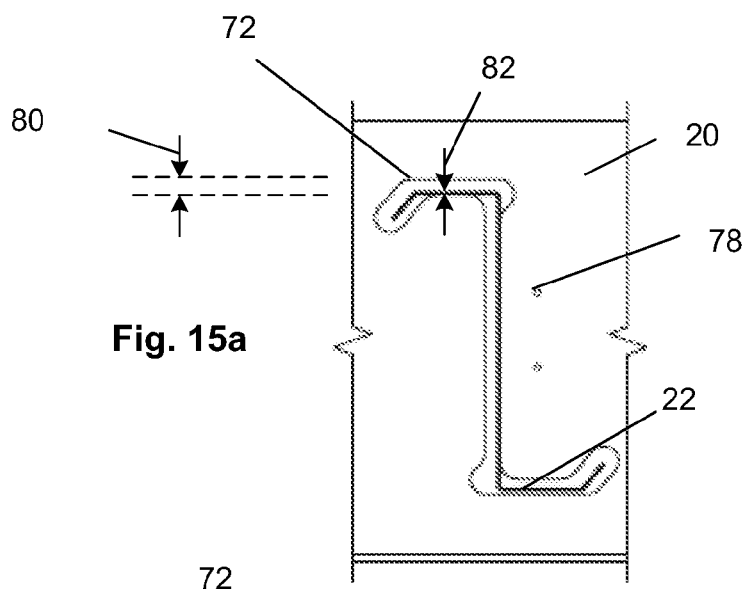
FIGS. 15a through 15c are side views of a length of a variation of the structural beam inserted through a variation of the support beam.

FIG. 1a illustrates a frame 10 or racking structure can be used to support power-generating modules 12, such as solar or photovoltaic (PV) modules, shown in FIG. 1b. The modules 12 can each have one or more solar cells. A group of modules 12 can form a panel, bay, or cluster of modules. For example a solar panel can be made from about 1 to 16 modules. The modules 12 can be used to generate electrical power from light power (i.e., photons). The modules 12 attached to the frame 10 can form a module system 14. The module system 14 can have or be connected to electronics to capture, regulate, store, and route the electrical power to a destination such as a power grid.

The frame 10 can be anchored to the ground and/or a foundation 16 (shown in FIGS. 5, 6a and 6b). Frames 10 can be placed adjacent to each other, for example forming an extended, contiguous structure connected by expansion joints 18, such as thermal expansion joints, having more than one anchor, such as posts or piles, and supporting a row of modules 12. One or more module systems 14 or rows of module systems 14 can form a group of rows or a solar array. The frame 10 can support the modules 12 away from the ground or foundation 16, such as with about 4 to 5 feet of vertical clearance below the bottom of the beams. The frame 10 can hold the modules 12 in a substantially flat plane. The frame 10 can alternately rotate the modules 12 and rotationally fix the modules 12.

The frame 10 can have a support beam 20. The support beam 20 can extend in a lateral direction. The frame 10 can have first, second, third and fourth structural beams 22a, 22b, 22c, and 22d, respectively. The structural beams 22 can be purlins. The structural beams 22 can be attached to the support beam 20. The structural beams 22 can extend in a longitudinal direction, perpendicular to the support beam 20. The structural beams 22 can be positioned at a non-perpendicular angle with respect to the support beam 20. All or some of the structural beams 22 can be parallel with the other structural beams 22. All or some of the structural beams 22 can be positioned at non-parallel angles with respect to the other structural beams 22.

The frame 10 can have one or more expansion joints 18. For example, the frame 10 can have one or more expansion joints 18 connecting a structural beam 22 to the respective structural beam first extension 22' (e.g., from the first, second, third or fourth structural beams 22a, 22b, 22c, or 22d, respectively, to first, second, third or fourth structural beam extensions 22a', 22b', 22c', or 22d', respectively). Each structural beam extension 22' can be collinear with the respective structural beam 22. The frame 10 can have expansion joints 18 that can connect a structural beam first extension 22a' to the respective structural beam second extension 22a" (not shown), and ad infinitum. The expansion joint 18 can reduce or eliminate internal strain on the modules when a first structural beam (e.g., first structural beam 22a) and the adjacent structural beam extension (e.g., first structural beam extension 22a') contract, as shown by arrows 23a, and expand, as shown by arrows 23b. For example, the thermal expansion coefficient of the modules 12 can be different than the thermal expansion coefficient of the structural beams 22. During the course of a day or across seasons, the outdoor temperature will change. The modules 12 and structural beams 22 to which the modules 12 are attached can expand and contract in response to the change in temperature (or other external forces, such as wind) at different rates. The expansion joints 18 can allow additional expansion and contraction of the structural beams 22 to reduce the force exerted on the modules 12 by the attachments with the structural beams 22 when differential thermal expansion or contraction occurs. The expansion joints 18 can connect the structural beams 22 in a rigid yet expandable and contractable fashion along the long axis of each row of structural beam and structural beam extensions such that wind loads can be carried down the structure and dissipated over a longer beam length. For example, the structural beams 22 can each be about 20 feet to about 50 feet and about 10 can be connected in a row, for example (e.g., 40 feet, or up to about 200 feet to about 500 feet total for a single connected row, for example about 60 modules long or about 120 modules total). The frame 10 can have one or more posts 24 or piles.

FIG. 1b illustrates that the modules 12 can be attached to the top of the structural beams 22 and/or the support beam 20. The modules 12 can be positioned orthogonally on the frame 10. For example, the modules 12 can be in a 2 (e.g., in the lateral direction) by 6 (e.g., in the longitudinal direction) grid on the frame 10. The post 24 and support beam 20 can be positioned between two 2-by-6 grids of modules. The modules 12 can each have electrical junction boxes 26, for example to connect to cables that draw electrical power from the module 12.

FIG. 2 illustrates that the frame can have a pile or post 24. The post 24 can be a beam that can be inserted into ground, foundation 16 (e.g., concrete/cement/asphalt), or a combination thereof. The post 24 can be oriented vertically or at a non-perpendicular angle to the horizontal plane 28. The post 24 can be attached directly or indirectly to the support beam 20, for example at a perpendicular or a non-perpendicular angle. The support beam 20 can be configured to rotate or tilt with respect to the post 24.

The tilt angle 30 can be formed between the horizontal plane 28 and the long axis of the support beam 20 (which extends in the lateral direction of the frame 10, as shown). The tilt angle 30 can be from about 0° to about 60°, more narrowly from about 20° to about 40° for example about 30°. The post 24 can be demarcated with indentations, ink, or other marks to indicate the appropriate location at which to position the tilt adjustment brace 32 and/or the tilt adjustment bracket 34 to result in a corresponding tilt angle 30. The plane formed across the top surface of the structural beams 22 can lie at the tilt angle 30 with respect to the horizontal plane 28.

The post 24 can attach to the support beam 20 at one or more pivot bolts, such as the upper pivot bolt 36a and the lower pivot bolt 36b, and at a tilt adjustment system 38.

One of the pivot bolts 36 can form a rotatable joint, hinge or pivot between the post 24 or an extension of the post (e.g., a post-to-support beam connector 40), and the support beam 20. One of the pivot bolts can be removed and the other pivot bolt can be loosened to allow the support beam 20 to rotate with respect to the post 24 or an extension thereof.

The tilt adjustment system 38 can have a tilt adjustment brace 32, one, two or more tilt adjustment brace bolts 42 (which can be nuts), a tilt adjustment bracket 34, a tilt adjustment strut 44, a tilt adjustment bottom bolt 46, a tilt adjustment top bolt 48, or combinations thereof. The tilt adjustment system 38 can be configured to control the tilt angle 30.

The tilt adjustment brace 32 can be a U-bracket. The tile adjustment brace 32 can fit around the post 24. The tilt adjustment brace 32 can be tightened to and loosed from the tilt adjustment bracket 34 with the tilt adjustment brace bolts 42. The tilt adjustment brace 32 and tilt adjustment bracket 34 can be fixed with a friction fit to the post 24, for example by tightening the tilt adjustment brace bolts 42.

A lower end of the tilt adjustment strut 44 can rotatably attach to and extend from the tilt adjustment bracket 34. The lower end of the tilt adjustment strut 44 can be hingedly attached to the tilt adjustment bracket 34 by the tilt adjustment bottom bolt 46. An upper end of the tilt adjustment strut 44 can rotatably attach to and extend from an attachment point with the support beam 20, for example at a drilled hole in the support beam 20. The upper end of the tilt adjustment strut 44 can be hingedly attached to the support beam 20 by the tilt adjustment top bolt 48.

The tilt adjustment brace bolts 42 can be loosened, releasing the friction fit of the tilt adjustment brace 32 and tilt adjustment bracket 34 from the post 24. The tilt adjustment brace 32 and tilt adjustment bracket 34 can be slid up and/or down the post 24, for example, aligning the tilt adjustment brace 32 and tilt adjustment bracket 34 with a demarcation indicating a desired tilt angle 30 shown on the post 24, or until a visual or measured inspection of the tilt angle 30 is achieved. The tilt adjustment brace bolts 42 can then be tightened, friction fitting and fixing the tilt adjustment brace 32 and tilt adjustment bracket 34 to the post 24, and fixing the tilt angle 30.

The tilt adjustment strut 44 can have multiple sections that can be lockably and unlockably extendable and contractable with each other, extending and contracting the length of the tilt adjustment strut 44. The tilt angle 30 can be adjusted by extending or contracting the length of the tilt adjustment strut 44.

The structural beams 22 can be slid through beam slots on the support beam 20. The structural beams 22 can fix to the support beam 20 with structural cross-brackets 50 (e.g., L-brackets). The structural cross-brackets 50 can be fixed, such as by screwing (e.g., at structural cross-bracket screw holes using Tek screws or similar, self-drilling, metal fasteners), crimping, welding, with epoxy, or a combination thereof, to the structural beam 22 and the support beam 20.

FIGS. 3 and 4 illustrate that the upper end of the post 24 can attach to the lower end of a post-to-support beam connector 40. The upper end of the post-to-support beam connector 40 can attach to the support beam 20. The post-to-support beam connector 40 can be configured to adjust vertically, as shown by arrows, with respect to the post 24 (as shown) and/or the support beam, adjusting the height of the support beam 20 from the ground or foundation 16. The height of the support beam 20 can be adjusted, for example from about 0 in. to about 6 in., more narrowly from about 0 in. to about 3 in., yet more narrowly from about 0 in. to about 2 in., for example, about 0 in., about 2 in., or about 3 in.

The post-to-support beam connector 40 can have upper and lower beam connector or height adjustment slots 52a and 52b, respectively. Upper and/or lower height adjustment or beam connector bolts 54a and 54b, respectively, can be inserted through the upper and lower height adjustment slots 52a and 52b, respectively, and through the post 24. The upper and/or lower height adjustment bolts 54a and 54b can be fixed to the post 24 in the direction of the long axis of the post 24. The upper and lower height adjustment bolts 54a and 54b can be loosened, for example to release a friction fit fixing the beam connector 40 to the post 24. The beam connector 40 can be translated with respect to the post 24. The upper and lower height adjustment bolts 54a and 54b can then be tightened to friction fit the beam connector 40 to the post 24, fixing the height of the support beam 20.

The first, second, third, and fourth structural beams 22a, 22b, 22c and 22d can be attached, respectively, to first, second, third and fourth structural beam extensions 22a', 22b', 22c' and 22d' by the expansion joints 18. Any of the extended structural beams 22 can extend along a row of module systems.

FIG. 5 illustrates the post-to-support beam connector 40 can attach to the upper end of the post 24. The long axis of the post 24 can be aligned and parallel with the long axis of the beam connector 40. The lower end of the beam connector 40 can have a beam connector upper slot 52a and a beam connector lower slot 52b, as shown in FIGS. 16 through 19. The upper end of the beam connector 40 can have upper and lower pivot bolt holes 56a and 56b, respectively. The upper and/or lower pivot bolts 36a and 36b can be inserted through the upper and lower pivot bolt holes 56a and 56b, respectively, and through the support beam 20, as described herein.

FIG. 6a illustrates that the when the top surface of the modules 12 can be at the same tilt angle 30 as the support beam 20. The tilt angle 30 can be fixed at a non-zero tilt angle, for example after installation and assembly of the module system 14 and during collection of light energy.

FIG. 6b illustrates that the tilt adjustment strut 44 can be disconnected and detached from the tilt adjustment bracket 34 (as shown) and/or from the support beam 20. The upper pivot bolt 36a and/or lower pivot bolt 36b can be tightened to the beam connector 40 and the support beam 20, for example, to fix the tilt angle 30. The tilt angle 30 can be about 0°, for example, during assembly, replacement or maintenance of the module system 14.

FIGS. 7 through 10 illustrate that the structural beam 22 can be a Z purlin beam. The structural beam 22 can have a structural beam body 58. The structural beam 22 can have a structural beam upper flange 60 perpendicular to the structural beam body 58 and an upper flange neck 62 extending at an angle (e.g., from about 30° to about 90°, for example about 45°) from the upper flange 60. The structural beam 22 can have a lower flange 64 perpendicular to the structural beam body 58, for example extending in a different lateral direction than the upper flange 60, and a lower flange neck 66 extending at an angle (e.g., from about 30° to about 90°, for example about 45°) from the lower flange 64.

The structural beam 22 can have one or more connection ports 68 configured to connect to the modules 14. For example, the structural beam 22 can have a connection port 68 at each end and two connection ports 68 near the middle of the length of the structural beam 22 configured to attach to two modules 14. The connection ports 68 can be elongated to allow the modules 14 to be adjusted along the long axis of the structural beam 22 during attachment and to allow translation during differential thermal expansion or mechanically-induced (e.g., by wind) translation between the module 14 and the structural beam 22.

The structural beam 22 can have one, two, three or more expansion connector ports 70 at each end of the structural beam 22, configured to attach to expansion joints 18.

FIGS. 11 through 14 illustrate that the support beam 20 can have one, two, three, four or more beam slots 72. The beam slots 72 can be open ports extending through the entire thickness of the body of the support beam 20. The circumference of the beam slot 72 can be a closed shape entirely within the support beam 20.

The support beam 20 can have upper and lower pivot slots 74a and 74b. The upper and lower pivot bolts 36a and 36b can be inserted through the upper and lower pivot slots 74a and 74b, respectively. The upper and lower pivot slots 74a and 74b can be placed at an angle to the long axis of the support beam 20 (e.g., from about 15° to about 60°, for example about 30°).

The support beam 20 can have upper and lower flanges extending perpendicularly from the support beam body.

The support beam 20 can have pass-through holes 76. Cables (not shown) for carrying electrical power generated by the modules 14, sending control and/or monitoring data, or otherwise, can be bundled if desired, and pass through the pass-through holes 76. The pass-through holes 76 can be used as handles to grip the support beams 20 during installation or maintenance.

The support beam 20 can have structural cross-bracket screw holes 78. The structural cross-bracket screw holes 78 can directly or indirectly (e.g., via screws) fixedly attach to the structural cross-brackets 50. The structural cross-brackets 50 can directly or indirectly fixedly attach to the structural beams 22. One, two or more structural cross-bracket screw holes 78 can be adjacent (e.g., within about 4 in., more narrowly within about 2 in.) to each beam slot 72.

Figure 15B:
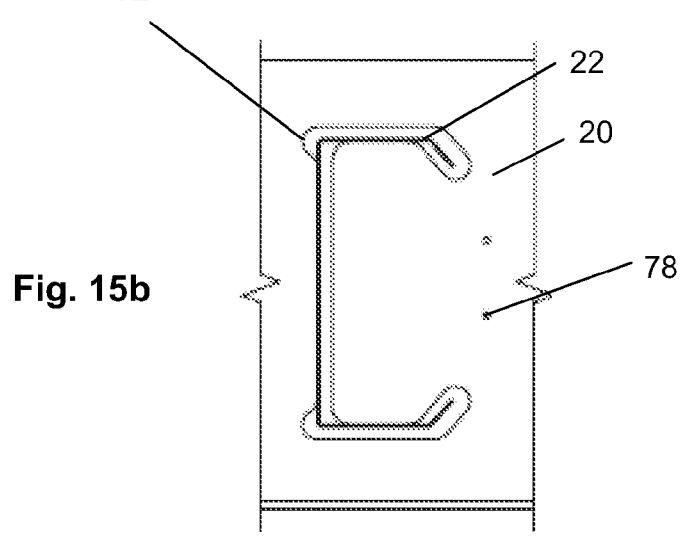
Figure 15C:
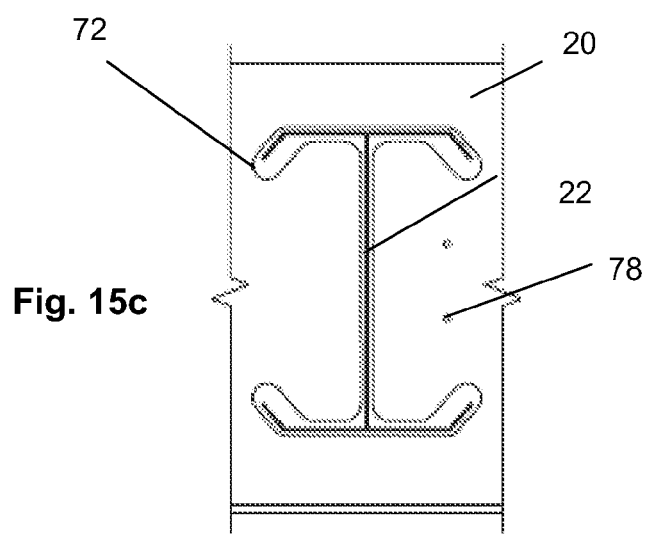
Figure 20:
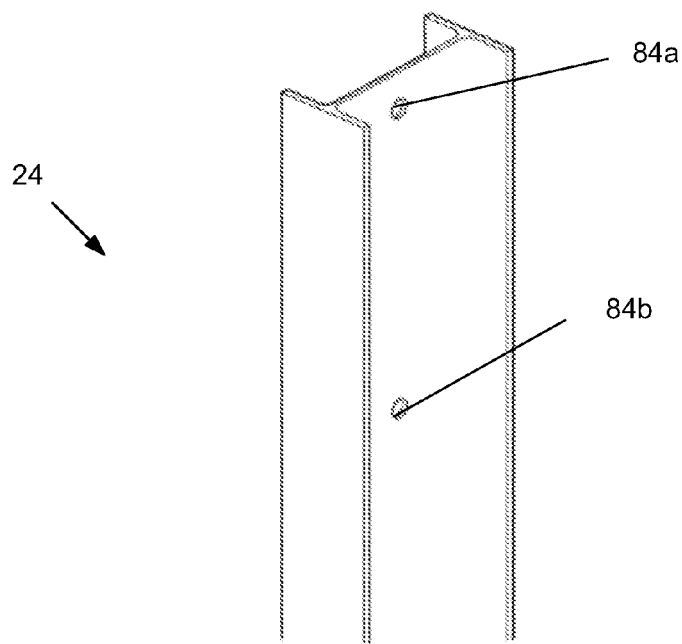
FIGS. 20 through 24 are perspective, top, front, side, and close-up side views, respectively, of a variation of the post.
Figure 21:
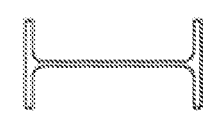
Figures 22, 23:
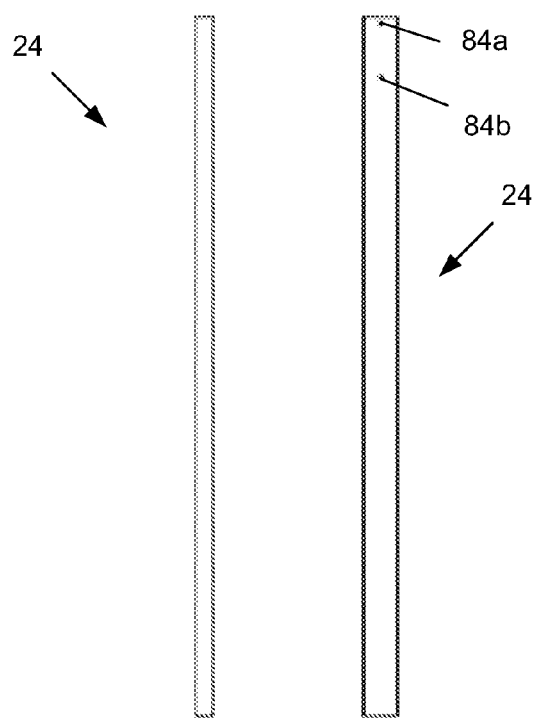
Figure 24:
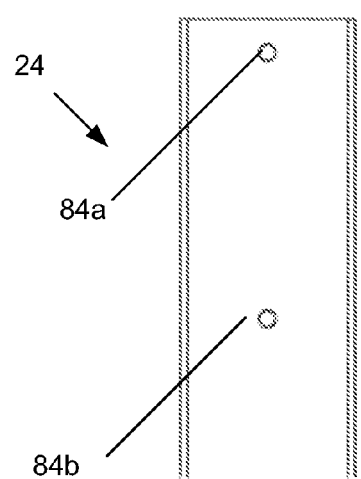
Figure 25:
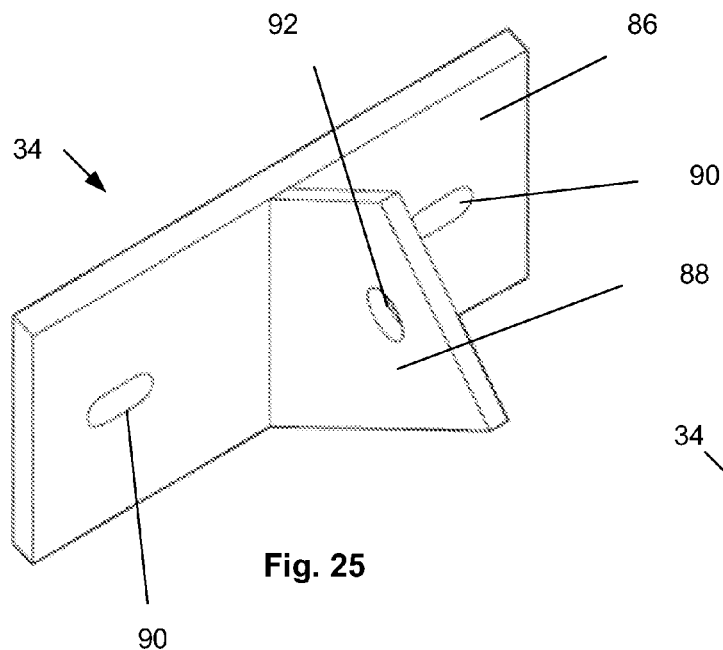
FIGS. 25 through 28 are perspective, top, rear and side views, respectively, of a variation of the tilt adjustment bracket.
Figure 26:
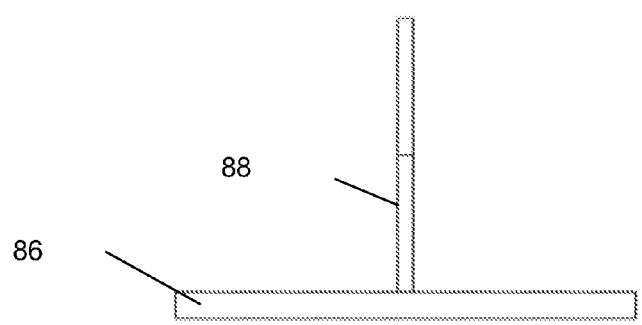
Figure 27:
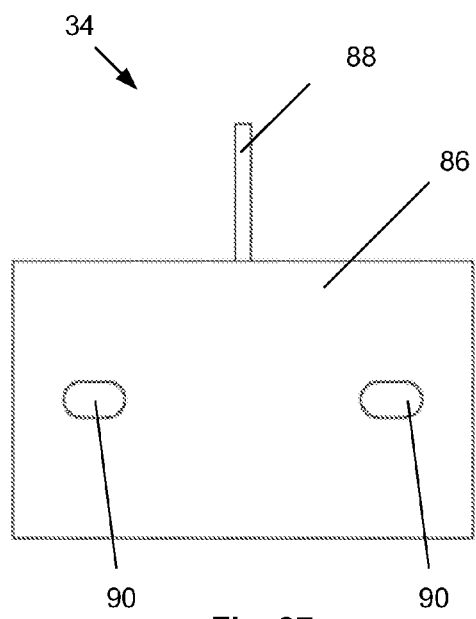
Figure 28:
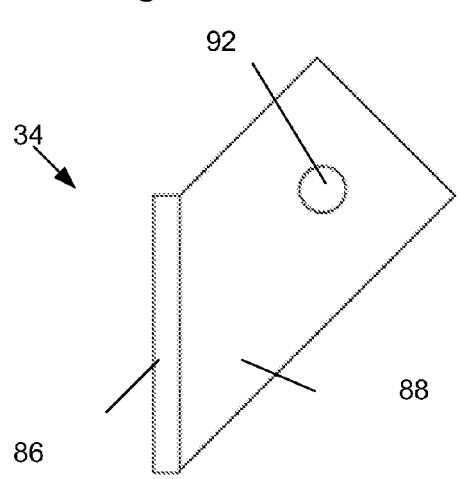
Figure 33:
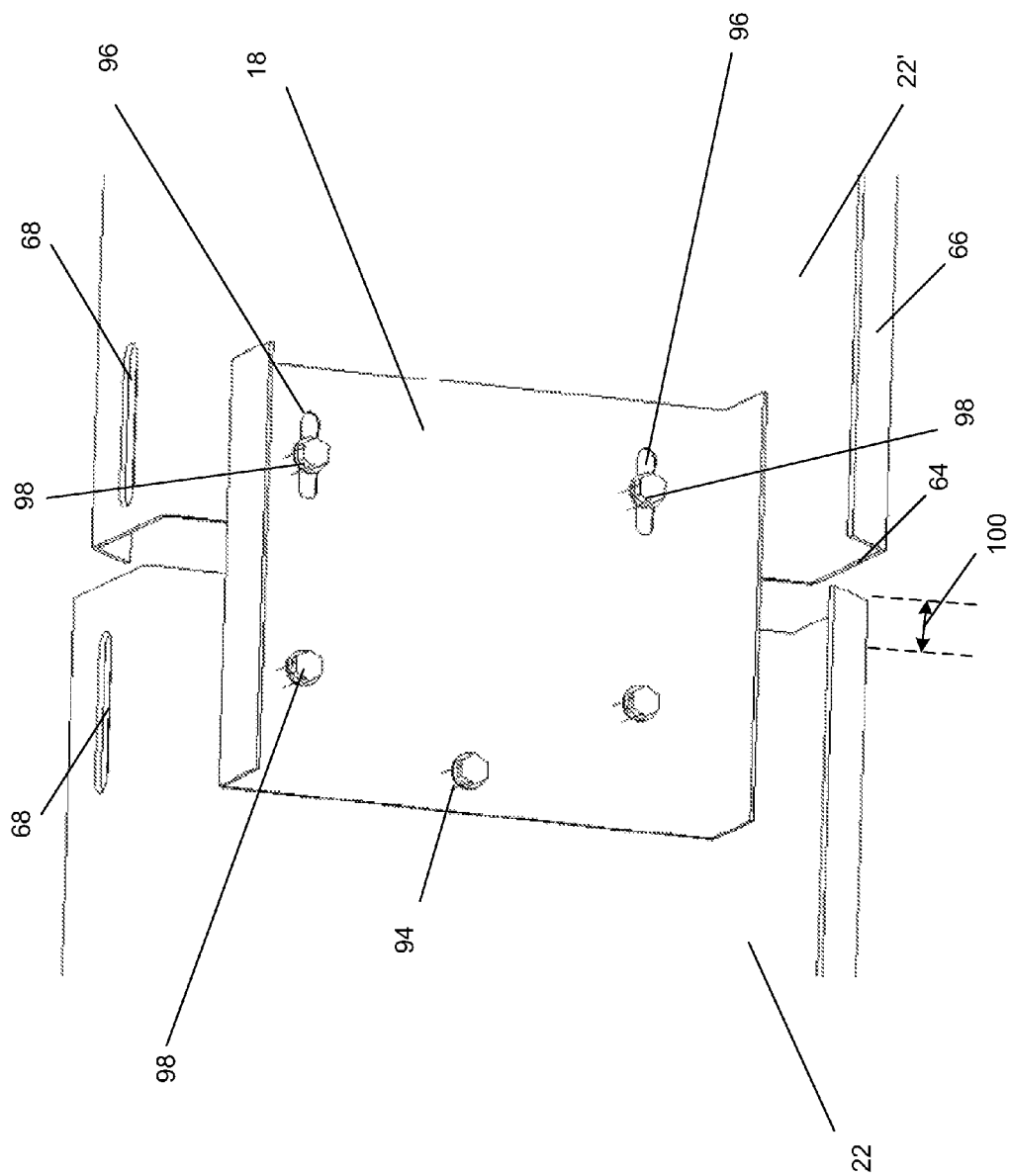
FIG. 33 illustrates a variation of the thermal expansion joint attached to structural beams.

FIGS. 15a through 15c illustrate that the beam slot 72 can have a beam slot width 80 from about 0.10 in. to about 0.75 in., for example about 0.40 in. The structural beam 22 can have a structural beam thickness 82 from about 0.050 in. to about 0.175 in., for example about 0.07 in. The structural beam 22 can be slid through the beam slot 72. The beam slot 72 can be shaped substantially identically to the structural beam cross-section.

FIG. 15a illustrates that the structural beam 22 can have a cross-section in a Z-shape.

FIG. 15b illustrates that the structural beam 22 can have a cross-section in a C-shape.

FIG. 15c illustrates that the structural beam 22 can have a cross-section in an I-shape.

FIGS. 16 through 19 illustrate that the post-to-support beam connector 40 can have the height adjustment or beam connector upper and lower slots 52a and 52b and the upper and lower pivot bolt holes 56a and 56b, as described herein.

FIGS. 20 through 24 illustrate that the post 24 can be an I-beam. The upper end of the post 24 can have a post upper hole 84a and a post lower hole 84b. The height adjustment or beam connector upper and lower bolts 54a and 54b can pass through the beam connector upper and lower slots 52a and 52b, respectively, and through the post upper and lower holes 84a and 84b, respectively, for example to attach the beam connector 40 to the post 24.

FIGS. 25 through 28 illustrate that the tilt adjustment bracket 34 can have a tilt adjustment bracket base 86. The tilt adjustment bracket 34 can have a tilt adjustment bracket flange 88 that can extend perpendicularly and at an upward angle from the tilt adjustment bracket base 86. The tilt adjustment bracket base 86 can have brace slots 90 for attachment to the tilt adjustment brace bolts 42 (or for the tilt adjustment brace 32 to extend through and attach to nuts). The tilt adjustment bracket flange 88 can have a strut hole 92 for the tilt adjustment bottom bolt 46 to attach to the tilt adjustment bracket 34.

FIGS. 29 through 33 illustrate that the thermal expansion joint 18 can have one, two three or more joint holes 94 at a first end of the joint 18, and one, two, three or more joint slots 96 at the second end of the joint 18, opposite to the first end. Expansion joint screws or bolts 98 can be inserted through joint slots 96 and joint holes 94 and through the underlying expansion connector ports 70 on the structural beams 22. The expansion joint screws or bolts 98 can be, for example, #12 SMS screws. The expansion joint bolts 98 can be affixed with fastening nuts placed on top of sliding washers (e.g. stainless steel or plated bushings). The expansion joint bolts 98 inserted through the joint holes 94 can longitudinally fix the expansion joint 18 to the structural beam 22. The expansion joint bolts 98 inserted through the joint slots 96 can allow longitudinal translation along the length of the slot between the expansion joint 18 and the structural beam extension 22', and thus between the structural beam 22 and the structural beam extension 22'.

The joint slots 96 can be from about 0.5 in. long to about 3.0 in. long, for example about 1.875 in. long.

The space between the structural beam 22 and the respective structural beam extension 22' can be a joint gap 100. The joint gap can vary due to external factors, such as variations in temperature, wind loads, weight loading, or combinations thereof. The joint gap can be from about 0.25 in. to about 4.0 in., for example about 1.0 in.

Figure 34:
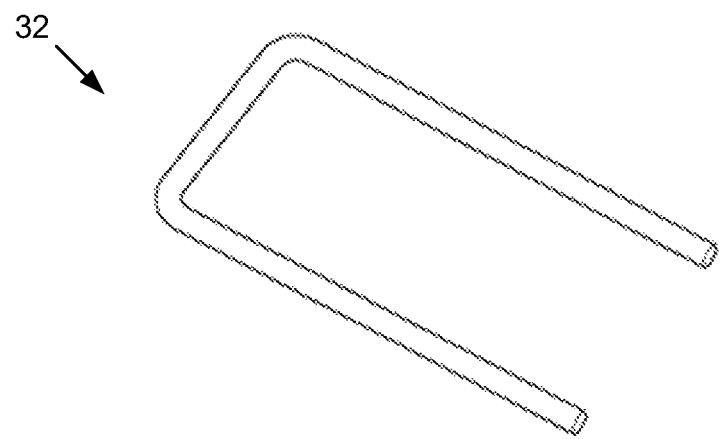
FIGS. 34 and 35 are perspective and top views, respectively of a variation of the tilt adjustment brace.
Figure 35:
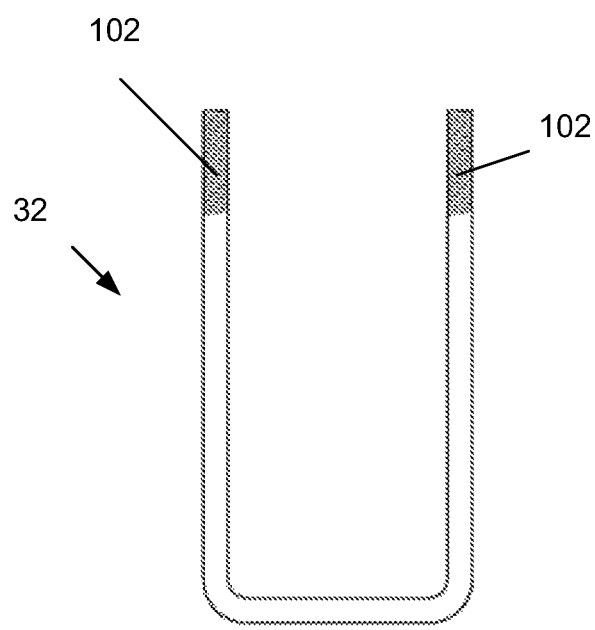

FIGS. 34 and 35 illustrate that the tilt adjustment brace 32 can be a U-bracket. The tilt adjustment brace 32 can have threaded attachment sections 102, for example at one or both terminal ends of the tilt adjustment brace 32. The tilt adjustment brace bolts 42 can be nuts that can attach to the threaded attachment sections 102.

Any or all bolts described herein can be used with washers (e.g., on one or both sides of the surface being bolted to or through) and nuts (e.g., on the opposite site of the surface being bolted to or through).

Any or all of the elements of the frame described herein can be made from a rigid material such as wood, metal, plastic, or combinations thereof. For example, any or all of the elements can be made from steel (e.g., stainless steel), aluminum, polyvinyl chloride (PVC), or combinations thereof.

Any elements described herein as singular can be pluralized (i.e., anything described as "one" can be more than one), and plural elements can be used individually. Any species element of a genus element can have the characteristics or elements of any other species element of that genus. The term "comprising" is not meant to be limiting. The above-described configurations, elements or complete assemblies and methods and their elements for carrying out the invention, and variations of aspects of the invention can be combined and modified with each other in any combination.

We claim:

1. An apparatus for generating solar power comprising:
   a solar power module;
   a post configured to fix to the ground;
   a connector attached to the post, wherein the connector is configured to translate with respect to the post along a longitudinal axis;
   a brace having a circular cross-section;
   a bracket comprising a base and a flange extending from the middle of the base, wherein the brace is attached to the bracket, and wherein the brace and bracket are secured to the post, wherein the flange extends at an upward angle from the base when the brace and bracket are secured to the post;
   a support beam rotatably attached to the connector, wherein the support beam has a beam slot therethrough;
   a tilt adjustment strut attached to the support beam and the bracket; and
   a structural beam traversing the support beam through the beam slot, wherein the solar power module is attached to the top of the structural beam, and wherein the structural beam is fixed to the support beam.

2. The apparatus of claim 1, wherein the beam slot has a closed circumference within the support beam.

3. The apparatus of claim 1, further comprising a structural beam extension and a thermal expansion joint attached to the structural beam and the structural beam extension.

4. The apparatus of claim 3, wherein the structural beam is collinear with the structural beam extension.

5. A method of assembling a solar power generating module system comprising:
   attaching a post to a ground or a foundation;
   attaching a connector to the post, wherein attaching the connector comprises translating the connector along a longitudinal axis with respect to the post;
   attaching a brace to a bracket around the post, wherein the brace has a circular cross-section, and wherein the bracket comprises a base and a flange extending from the middle of the base;
   securing the brace and bracket to the post, wherein the flange extends at an upward angle from the base when the brace and bracket are secured to the post;
   attaching a support beam to the connector, wherein the support beam is configured to tilt with respect to a horizontal plane, and wherein the support beam has an open beam slot formed within the support beam;
   attaching a tilt adjustment strut to the support beam and the bracket;
   attaching a structural beam to the support beam, wherein attaching the structural beam comprises translating the structural beam through the support beam via the beam slot; and
   attaching a solar power module to the structural beam.

6. The method of claim 5, further comprising manually adjusting the tilt angle, wherein manually adjusting the tilt angle comprises moving the tilt adjustment strut.

7. The method of claim 5, further comprising increasing the height of the support beam from the ground or the foundation, wherein a beam connector is attached to the support beam and the post, and wherein increasing the height of the support beam comprises translating the beam connector with respect to the post.

8. An apparatus for generating solar power comprising:
   a solar power module;
   a post configured to fix to the ground;
   a connector attached to the post, wherein the connector is configured to translate with respect to the post along a longitudinal axis;
   a brace having a circular cross-section;
   a bracket comprising a base and a flange extending from the middle of the base, wherein the brace is attached to the bracket, and wherein the brace and bracket are secured to the post, wherein the flange extends at an upward angle from the base when the brace and bracket are secured to the post;
   a support beam rotatably attached to the connector;
   a tilt adjustment strut attached to the support beam and the post, wherein the strut is attached to the bracket;
   a structural beam traversing the support beam through a beam slot, wherein the solar power module is attached to the top of the structural beam, and wherein the structural beam is fixed to the support beam; and
   a structural beam extension and a thermal expansion joint attached to the structural beam and the structural beam extension.

9. The apparatus of claim 8, wherein the structural beam is collinear with the structural beam extension.

10. The apparatus of claim 8, wherein the support beam is configured to tilt with respect to a horizontal plane.

* * * * *